May 20, 1941.	L. IVERSEN	2,243,010
ROLLING MILL
Filed May 26, 1934	4 Sheets-Sheet 1
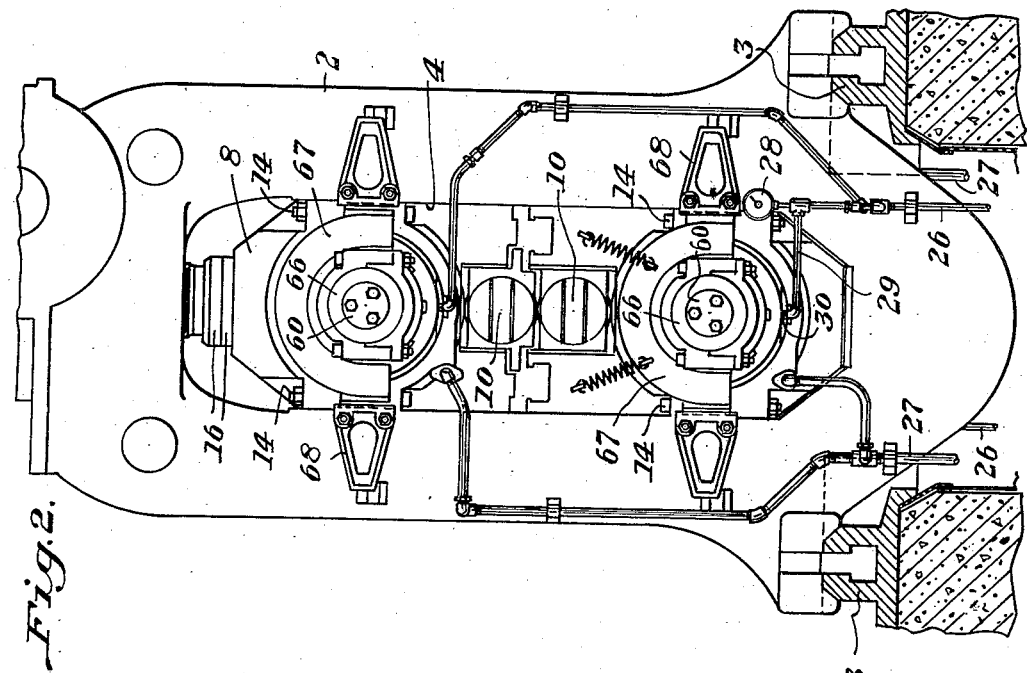
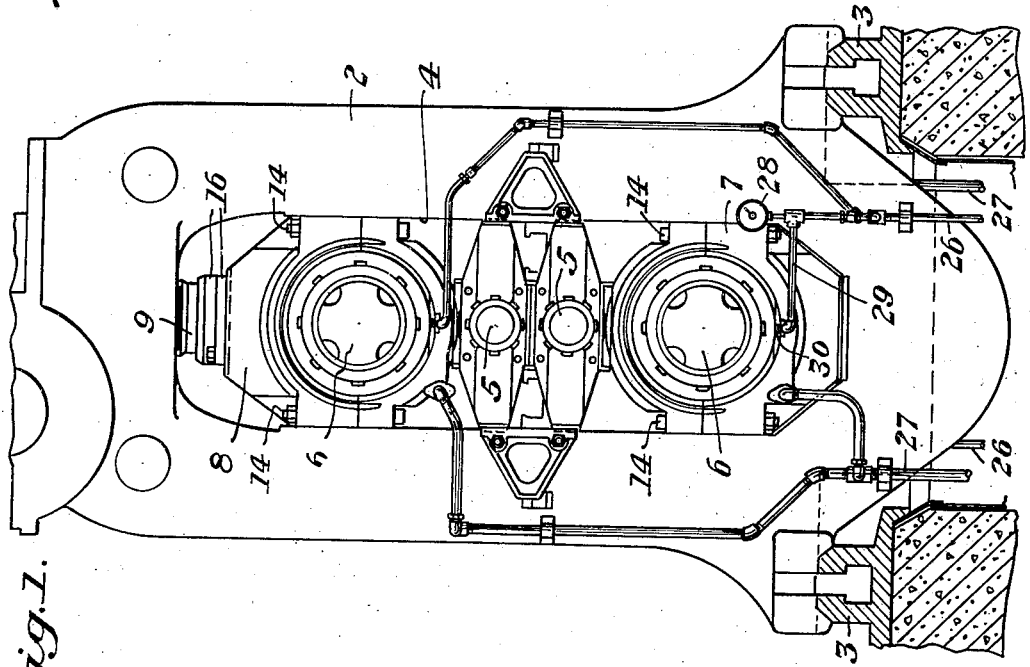
INVENTOR
Lorenz Iversen
by his attorneys
Byrnes, Stebbins & Blenko

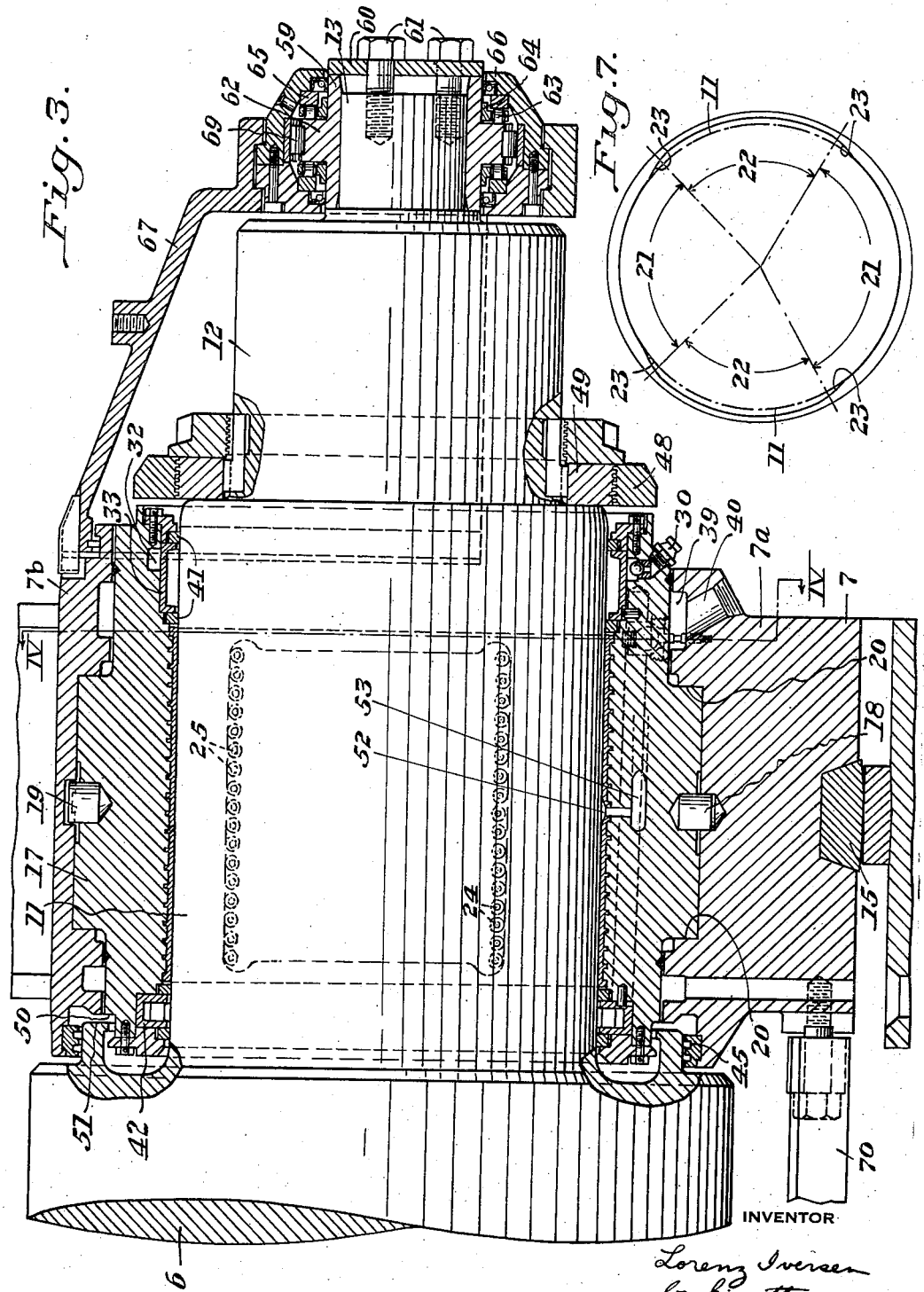

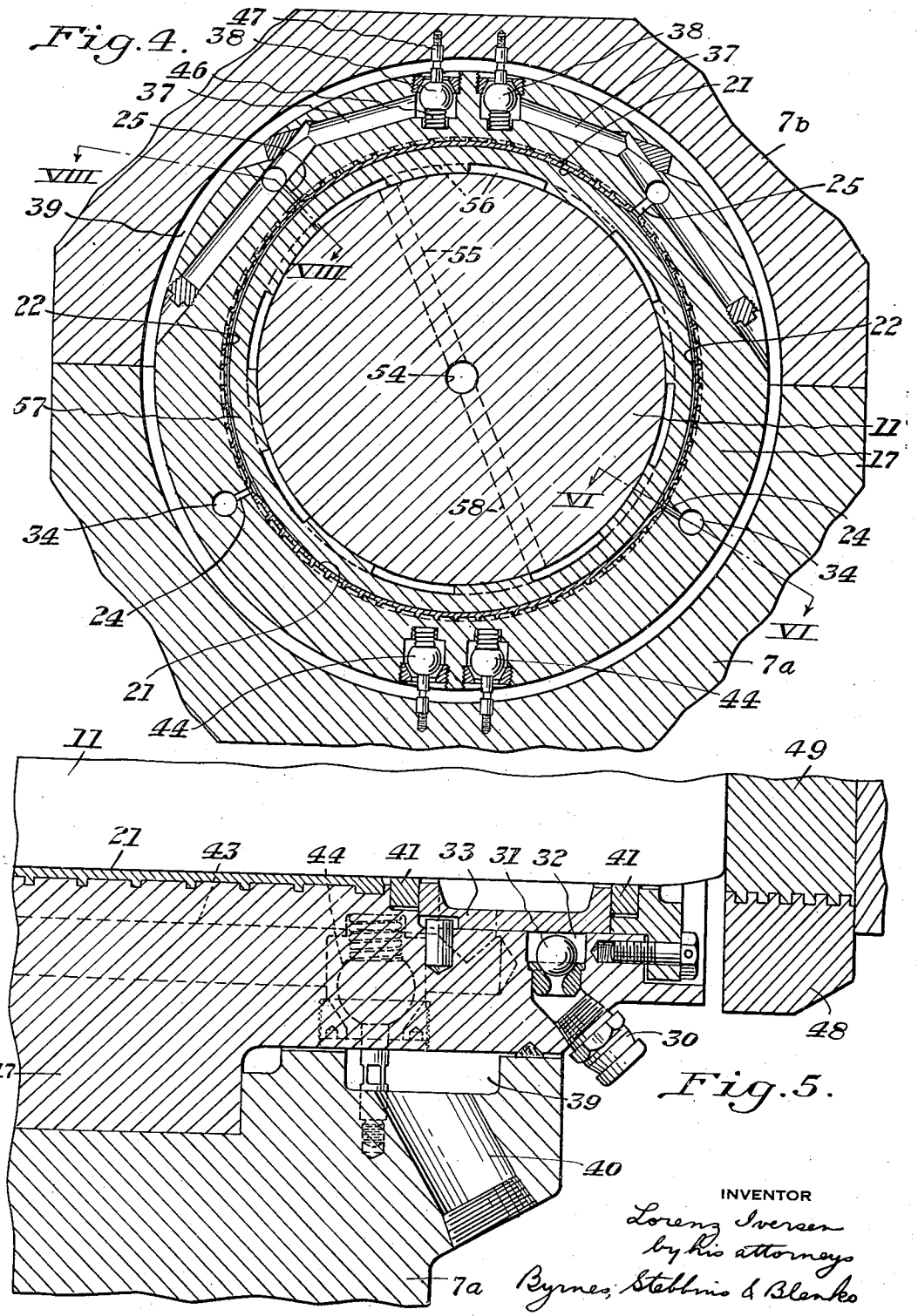

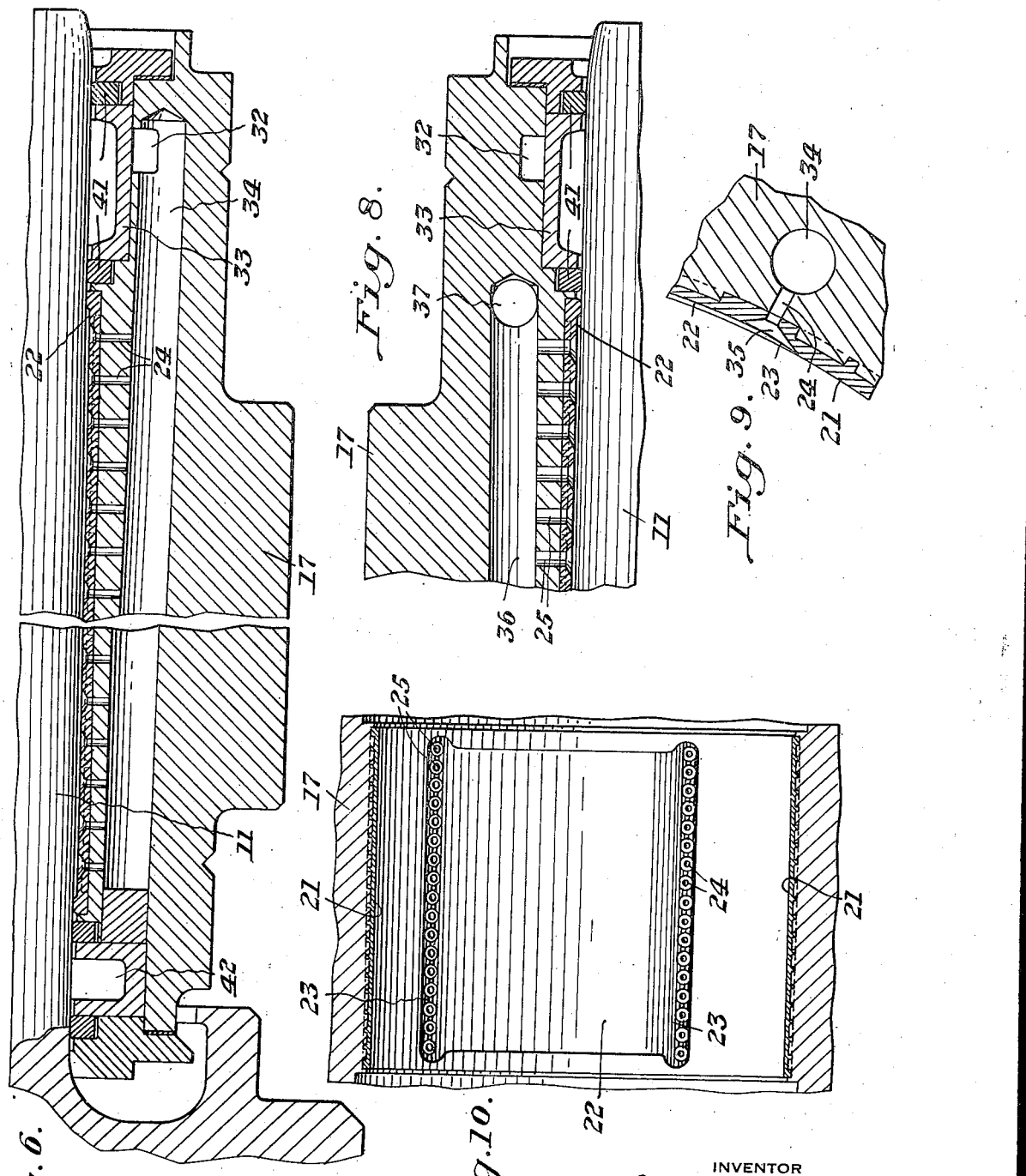

Patented May 20, 1941

2,243,010

UNITED STATES PATENT OFFICE 2,243,010

ROLLING MILL

Lorenz Iversen, Pittsburgh, Pa., assignor to Mesta Machine Company, Pittsburgh, Pa., a corporation of Pennsylvania Application May 26, 1934, Serial No. 727,701

30 Claims. (Cl. 30—38)

This invention relates to rolling mills, and particularly to bearings for the necks of rolling mill rolls. The invention is herein particularly described as applied to the backing rolls of a 4-high strip mill, but it will be understood that this is by way of example only and that the invention has numerous other applications.

In strip mills of the 4-high type, there are employed relatively small working rolls which are supported by backing rolls of larger diameter. The forces to which the rolls are subjected during strip rolling are exceedingly high and in order to reduce the bearing friction to a minimum it has heretofore been common to use roller bearings. The 4-high or cluster type of mill provides sufficient space for adequate bearings of this type and they have been widely used. Such bearings, however, particularly in the larger sizes, are very expensive, and unless very accurately made, do not function properly. It is essential in bearings of this type that the inner and outer races be exact both as to diameter and concentricity, and that the rollers be of exact and uniform diameter. The manufacture of such bearings entails considerable expense and of course conditions existing around strip mills require the most extreme care in the shielding of the bearings from such deleterious agents as grit and dirt.

It has heretofore been considered impossible to use bearings of the sliding friction type for mills of the character under discussion. Ordinary "brasses" have, of course, been used for many years in various types of mills, but such brasses are not satisfactory for use in modern strip mills. They wear too rapidly, the coefficient of friction is too high, and it is difficult if not impossible to maintain accuracy of gauge in the product. It is well recognized that very low coefficients of friction can be obtained by high grade oil lubrication, and that if the oil film is maintained thin and uniform, a heavy load-carrying capacity is also obtainable. The difficulty has been that under the conditions existing in rolling mills there has been no possibility of meeting such requirements. It must also be borne in mind that accuracy of gauge in the strip is always a paramount consideration and that any bearing employed must be such as to insure that the oil film will be of substantially unvarying thickness insofar as is possible. Otherwise, accuracy of gauge will not be obtained.

Another consideration in bearings for rolling mill rolls, constituting a still further differentiation from the problem of ordinary machine bearings, arises out of the fact that the rolls must be periodically removed from the mill to have their bodies ground or otherwise dressed. It is important that the high quality of the bearing be unaffected by reason of the removal of a roll for grinding.

I have solved the problem presented and have successfully constructed and used bearings of the sliding friction or journal type in accordance with the invention herein described.

In the accompanying drawings illustrating a present preferred form of the invention, Figure 1 is a side elevation of a 4-high strip mill embodying my improvements;

Figure 2 is a view of the same mill from the opposite side;

Figure 3 is a longitudinal section to enlarged scale through one of the improved bearings;

Figure 4 is a section on the line IV—IV of Figure 3;

Figure 5 is a view to enlarged scale of a portion of Figure 3;

Figure 6 is a longitudinal section on the line VI—VI of Figure 4;

Figure 7 is a diagram showing the arrangement of the journal-engaging surfaces of the bearing;

Figure 8 is a view to enlarged scale taken on the line VIII—VIII of Figure 4;

Figure 9 is an enlarged section transverse to the roll axis showing lubricant supply passages, and Figure 10 is a longitudinal vertical section through the journal-receiving bearing shell with the roll neck removed therefrom.

The mill illustrated in Figures 1 and 2 comprises housings 2 carried on shoe plates 3 and having windows 4 in which the mill roll bearings are carried. The mill has working rolls 5 and backing rolls 6 of relatively large diameter. The lower backing roll is carried in a chuck 7 lying at the bottom of the window and the upper backing roll is mounted in a chuck 8, its vertical position being controlled by a screw-down 9. Many of the details of construction have been omitted from Figures 1 and 2 for purposes of clarity in illustration. Figure 2 shows the notched ends 10 of the working rolls whereby a driving connection is made to them, and also shows the thrust bearings hereinafter described which are provided for the backing rolls.

Referring to Figure 3, one of my improved bearings is shown in detail and in this case the lower backing roll happens to be the one which is illustrated. It will be understood, however, that the structure is similar for the upper roll. It will be further understood that the same bearing structure, except for the thrust bearing structure hereinafter described, is applied at each end of each backing roll. The backing roll 6, as illustrated in Figure 3, has a neck 11, a reduced concentric projecting neck portion 12, and a still further reduced concentric projecting neck portion 13. The portion 11 constitutes the shaft portion of the journal bearing which carries the rolling load.

The chuck 7 is made in two halves 7a and 7b arranged to be secured together by bolts 14 (see Figures 1 and 2). The chucks 7 for the lower roll are carried on rocker plates 15 so that the chucks can tilt bodily as the roll deflects. The chucks for the upper roll are provided with breaker blocks 16 beneath the screw, which breaker blocks have interfitting spherical surfaces, thereby permitting a like tilting action of the upper chucks.

Referring again to Figure 3, the two halves of the chuck 7, when assembled, embrace and rigidly support a journal-receiving shell indicated generally by the reference character 17. The shell is arranged to stay always with the roll to which it is fitted. When the roll requires dressing or when for any other reason it is replaced, the roll with its chucks is removed bodily from the mill and the halves of the chucks are then separated. The shells stay with the roll and should preferably never be removed from it, thus insuring that the coacting surfaces will not be disturbed. The journal-receiving shell 17 carries a positioning pin 18 at the bottom and a like pin 19 but of larger diameter at the top. Corresponding recesses are provided in the chuck halves 7a and 7b as shown in Figure 3. This arrangement insures proper positioning of the parts for assembling and prevents the shell being positioned upside down. The pins 18 and 19 hold the shell against rotation with respect to the chuck, and shoulders 20 hold the parts against relative endwise movement, so that when assembled the chuck and the shell function as a unitary member.

It is important to supply lubricant in such manner that the journal will always have a proper lubricant supply, and I also make provision for retaining in the bearing a sufficient quantity of lubricant to insure adequate oiling even though the oil supply should fail. I contemplate supplying oil from a tank by a small pump, but it is important that in case of pump failure the bearing shall continue to function. In point of fact, my bearing does so function, the only noticeable effect being a slow rise in temperature which indicates that the oil supply has failed. The temperature rise is so slow that there is ample time for curing the difficulty without endangering the bearing itself.

The bearing loads in rolling are principally vertical. This, of course, holds true only where the rolls are stacked vertically. For example, in a cluster mill the loads are in a diagonal direction, and it is to be understood that I contemplate a corresponding adjustment of my bearing in such case. Confining ourselves, however, for the purpose of discussion to a 4-high mill, it may be stated with accuracy that the pressure of the neck on the bearing shell will be at the top or bottom portion thereof. It is sufficient, therefore, if the upper and lower portions of the shell constitute the bearing surfaces. It will be understood that the upper portion will be under pressure from the rolling load in the case of the upper roll, and that the lower portion will be under pressure from such load in the case of the lower roll. However, between actual rollings the weight of the upper roll may be carried by the lower portion of its bearings.

Figure 7 illustrates the bearing shell in diagram. The portions 21 constitute the bearing surfaces whereas through the portions 22 the shell surface is relieved as shown, so that there is a small clearance between the inner face of the journal shell in the portions 22 and the surface of the neck. Short inclined portions 23 are provided at the junctions of the portions 21 and 22. The oil is fed into the clearance spaces provided by the portions 22 and, being entrained by the rotating neck, is carried into the bearing portions 21. The wedge-like transition portions 23 aid in this and insure that a uniform film of oil will be supplied to the working surfaces. Figure 10 shows one of the relieved portions 22 in elevation.

I have found it sufficient for my purposes if oil is merely circulated through the relieved portions 22, and to this end I introduce oil through a series of openings 24 near the bottoms of the clearance spaces 22 and take it off through similar openings 25 near the tops of such clearance spaces. A circulation of oil in direct contact with the roll neck is thereby brought about. Such circulation is in an amount sufficient to cool the journal and considerably greater than that required for lubricating the neck. There is no short-circuiting of oil to a degree which precludes adequate lubrication of the working surfaces because, as stated, entrainment of the oil by the neck and the provision of the inclined portions 23, insures that a sufficient quantity for lubrication will be carried to the working surfaces.

The oil is supplied to the bearings from a reservoir by means of a pump, and after circulating through the bearings the oil is preferably filtered, cooled and returned to the reservoir. The reservoir, pump, filter and cooler are well known expedients and are not herein illustrated nor described. Suffice it to say that the pressure employed is relatively low, for example, ten pounds. Pressures of this order are ample to cause circulation of the lubricant through the bearing. Figures 1 and 2 illustrate supply pipes 26 and return pipes 27. Pressure gauges are preferably interposed in the supply lines so that visual inspection will show whether or not the oil is properly circulating. Oil from the supply pipes 26 is fed to the bearings through flexible connections 29 coupled to a fitting 30. The oil passes from the fitting through a check valve 31 to an annular passage 32 formed by a recess in the bearing shell and having its inner face covered by a spacer ring 33. The passage 32 communicates with longitudinally drilled holes 34 (see Figures 4 and 6) leading to the openings 24. The openings 24 are sufficiently small in cross section compared with the cross section of the bore of the holes 34 that a substantially uniform pressure is obtained throughout the length of the bore 34, and consequently a substantially uniform oil feed longitudinally of the bearing is obtained. Further assurance that the oil will be properly distributed is obtained by flaring the ends of the openings 24 as indicated at 35. The oil is thus fed to the recesses 22 and flows upwardly therein to the openings 25. It escapes through these openings (see Figures 4 and 8) to longitudinal passages 36, thence to passages 37 and, thence through normally open check valves 38, to an annular passage 39 (see Figure 5) from which the oil is taken off through a passage 40 communicating with the outlet pipes 27. In case of accidental stoppage of the oil flow, the check valve 31 will seat and a body of oil will thereby be maintained in the bearing, thus precluding any danger of the bearing burning out. It is important to note that in my invention circulation of the oil effects cooling but is not essential (for a reasonable time at least) to the continued supplying of oil to the bearing surface.

It is important to prevent loss of oil from the bearing and it is equally important to seal the bearing against the entrance of water, mill scale, and grit. The escape of oil from the bearing during operation is prevented by a dual seal consisting of two closely fitted rings 41 at each end of the bearing separated by the spacers 33 and 42. These spacers are recessed to provide annular passages around the roll neck between the sealing rings. Any oil which may succeed in leaking past the inner ring drains into the annular passages. They are connected at their bottoms to longitudinal passages 43 and thence past normally open check valves 44 to the annular drain passage 39. The oil which has thus leaked out of the bearing is returned with the oil which has passed through the bearing and may be filtered with it for reuse.

The outer sealing rings 41 guard against the entrance of foreign matter from the outside and may be supplemented, particularly at the bearing end next to the roll body, by labyrinth water seals 45.

It is equally important that the bearings be protected against the ingress of foreign matter when the rolls are taken out, as, for example, for regrinding. The inlet 30 may be capped or plugged but it is important that the outlets be likewise closed off and this is more difficult since, for reasons now apparent, the outlet is preferably formed in the chuck. The valves 38 and 44 serve to close off the outlets when the bearing is dis-assembled. To this end they are provided with springs 46 normally tending to close the valves. The valves are held open when the chuck is assembled by means of pins 47. As soon as the pressure of the pins 47 is released, as by lifting off the top half of the chuck or by lifting the shell out of the lower half, the check valves spring shut and stay closed until the bearing is reassembled.

In order to prevent any ingress of foreign matter at the ends of the journal-receiving shell, provision is made for moving it bodily on the neck and closing off its ends. A nut 48 is threaded on a collar 49 secured to the roll neck at the inner end of the reduced portion 12. This nut occupies the position shown in Figure 3 when the parts are assembled for running, but when the roll has been removed from the chucks, the nut 48 may be turned up to engage the end of the bearing shell. Continued rotation of the nut forces a shoulder 50 against the end face of the water lip 51 on the roll body, thereby effectually sealing off both ends of the bearing shell.

An important advantage of my invention from a practical point of view is that the bearing shell is smaller than the working roll body, as is illustrated in Figure 3. The rolls must be removed from the mill from time to time for redressing. My improved construction permits of the roll being mounted in a roll grinder or other apparatus and having its surface dressed or turned without the bearing shells in any way hindering the operation of the roll grinder or other mechanism. At the same time, the bearing surfaces are so thoroughly protected that there is no danger of any foreign material, such as dust or grit, getting into the bearings during the roll dressing operation or during handling of the roll while it is outside the mill.

A bearing of the sort just described will operate with a minimum of friction and with the utmost of satisfaction over long periods of time. Little or no difficulty will be experienced in keeping it cool or in starting it up under load. However, additional features of my invention now about to be described may be used if it is wished to take extra precautions against such possibilities.

In case the mill should be stopped under load, it may be desirable to introduce a small quantity of oil under high pressure into the bearing area of the journal so as to replace any oil which may have been squeezed out. This is done by providing an opening 52 communicating with a conduit 53 through which oil is supplied under high pressure. It is to be understood that oil will not ordinarily be supplied through this opening, but if the mill should stand idle for a continued period of time under load it may be desirable to inject a quantity of oil through the passage under high pressure so as to insure that no scoring of the journal will result when the mill is started up and before the rotation of the neck has served to carry the oil into the bearing.

It may be desirable, particularly in mills for hot rolling, to provide additional cooling facilities for the bearings. This may be done if desired by using water cooling. I have indicated in Figure 4 one way of doing this. The roll is axially bored, as indicated at 54, and water is supplied through the hole. It travels through a radial passage 55 to a helical passage 56 formed in a sleeve 57 which is shrunk on the neck proper and forms the journal surface. The helical passage extends around the journal for its full length and finally terminates in a radial opening 58 which leads back to the central bore 54. The central opening 54 is plugged between the openings 55 and 58 so as to prevent short-circuiting. The water after going through one bearing travels through the hole 54 to the other end of the roll and travels through similar cooling passages there.

When the roll has been taken out of the mill, the reduced neck portions 12 serve to support the roll in the roll lathe or grinder so that the bearings are not in use at all during these operations.

To take care of end thrust there is provided at one end of each roll a thrust bearing which is indicated in detail in Figure 3. The thrust is met by a collar 59 around the neck portion 13, held in place by an end plate 60 and screws 61. The collar has a flange 62 and thrust rollers 63 carried by cages 64 are placed on each side of such flange. Races 65 lie outside the rollers 63, these races being carried in a case 66 which, in turn, is mounted in a bracket 67. The bracket 67 is anchored to the mill housing by clamps 68 (see Figure 2). The bracket is free to slide up and down between the clamps and the housing in response to the screwdown but with such small clearance as to leave but a minimum of axial play. The case 66 has a certain amount of play in the bracket 67 so no clamping action results if the roll is flexed under load. A radial bearing 69 permits free running of the case 66 on the roll.

A spider 70 (see Figure 3) is provided to hold the chucks in proper spaced relation when the parts are assembled ready for placing in the mill. This is a convenient device because the chucks are free to move endwise with the journal shells on the necks until placed in the housing and thus restrained.

An important advantage of my invention is that it can be used in mills which have been designed for ordinary roller bearings. The outer dimensions of the chucks can be the same as the chucks for roller bearings. Another important advantage is that by the use of my invention it is possible to employ rolls with larger necks than would be used on rolls of the same diameter but where rollers bearings are employed. This permits of making the necks stronger and stiffer and also gives a greater bearing area and hence a lower unit bearing load.

I have illustrated and described present preferred embodiments of the invention, but it will be understood that this is by way of illustration only and that it may be otherwise embodied or practiced within the scope of the following claims.

I claim:

1. In a rolling mill, a roll having a neck, a shell embracing the neck and bodily movable with the roll, and a sealing ring carried by the roll neck effective for closing off the ends of the shell, the sealing ring being normally spaced from the shell but movable into engagement therewith.

2. In a rolling mill, a roll having a neck, a shell embracing the neck and bodily movable with the roll, and a sealing ring carried by the roll neck effective for closing off the ends of the shell, the sealing ring being normally spaced from the shell but threaded for axial movement into engagement therewith.

3. In a rolling mill, a roll having a neck, a shell embracing the neck, the shell having a bearing surface extending around a portion only of the periphery, the bore being relieved around a portion of the circumference to provide a space adjacent the bearing surface between the neck and the shell, means for supplying lubricant to a lower portion of such space and for taking off lubricant at an upper portion thereof, and check means for preventing back flow of lubricant through the inlet.

4. In a rolling mill, a roll having a neck, a shell embracing the neck and bodily movable with the roll, a chuck arranged to receive and support the shell, a passage in the shell to permit flow of lubricant to the journal, and means for closing off the passage when the shell is separated from the chuck.

5. In a rolling mill, a roll having a neck, a shell embracing the neck and bodily movable with the roll, a chuck arranged to receive and support the shell, a passage in the shell to permit flow of lubricant to the journal, a check valve in the passage, and means on the chuck for opening the check valve when the shell is positioned therein.

6. In a rolling mill, a roll having a body and a neck, a shell embracing the neck and bodily removable from the mill with the roll, the shell constituting the stationary member of a neck bearing of the sliding friction type, and a concentric neck portion projecting beyond the bearing shell and providing an exterior circumferential supporting surface to permit of mounting the roll, for example, in a roll lathe, for dressing the roll body.

7. In a rolling mill, a roll having a body and a neck, a shell embracing the neck and bodily removable from the mill with the roll, the shell forming the stationary member of a neck bearing of the sliding friction type, a concentric neck portion projecting beyond the bearing shell and providing a supporting surface to permit of mounting the roll, for example, in a roll lathe, for dressing the roll body, and means for sealing the ends of the shell during such dressing.

8. In a rolling mill, a roll having a neck, a shell embracing the neck, the shell having a bearing surface on the upper portion of its bore, the shell having a relieved portion at the side to provide a recess between the shell and the neck, an inlet communicating with the recess and adapted for the supply of lubricant thereto, the inlet being adjacent the bottom of the recess, and an outlet leading from the same recess but a higher level.

9. In a rolling mill, a roll having a neck constituting a bearing journal for the roll, a shell embracing the neck, the shell having a cylindrical bearing surface, the cylindrical surface being relieved to provide a recess between the shell and the neck adjacent such bearing portion, an inlet port adapted for the supply of lubricant to the recess, an outlet leading from the same recess and means for circulating a flood of oil from the inlet through the recess and to the outlet in amounts in excess of that required for proper lubrication to remove heat generated in the bearing.

10. A rolling mill comprising a horizontally disposed mill roll having a body and necks, the necks having surface portions constituting the journal portions of sliding bearings for the roll, shells encircling and circumferentially wholly enclosing the necks and making a running fit with the journals, the roll and the shells constituting a unit assemblage, chucks embracing and supporting the shells, the chucks being removable from the shells without disturbing the assemblage of roll and shells, and mill housings having windows for the chucks.

11. A rolling mill comprising a horizontally disposed mill roll having a body and necks, the necks having surface portions inseparable from the body and constituting the journal portions of sliding bearings for the roll, shells encircling and circumferentially wholly enclosing the necks and making a running fit with the journals, the roll and the shells constituting a unit assemblage, chucks embracing and supporting the shells, the chucks being removable from the shells without disturbing the assemblage of roll and shells, and mill housings having windows for the chucks.

12. A rolling mill comprising a mill roll having a body and necks, the necks having surface portions constituting the journal portions of sliding bearings for the roll, shells encircling and circumferentially wholly enclosing the necks and making a running fit with the journals, the shells being generally cylindrical in external configuration, the roll and the shells constituting a unit assemblage, chucks embracing and supporting the shells, the chucks being removable from the shells without disturbing the assemblage of roll and shells, and mill housings having windows for the chucks.

13. A rolling mill comprising a mill roll having a body and necks, the necks having surface portions constituting the journal portions of sliding bearings for the roll, shells encircling and circumferentially wholly enclosing the necks and making a running fit with the journals, the shells having outside diameters smaller than the diameter of the roll body, chucks embracing and supporting the shells, and mill housings having windows for the chucks, the roll with its shells and chucks being bodily removable from the housings.

14. A rolling mill comprising a mill roll having a body and necks, the necks having surface portions constituting the journal portions of sliding bearings for the rolls, shells encircling and circumferentially wholly enclosing the necks and making a running fit with the journals, chucks embracing and supporting the shells, means preventing assemblage of the shells in the chucks except in a predetermined orientation, and mill housings having windows for the chucks.

15. A rolling mill comprising a mill roll having a body and necks, the necks having surface portions constituting the journal portions of sliding bearings for the roll, shells encircling and circumferentially wholly enclosing the necks and making a running fit with the journals, the roll and the shells constituting a unit assemblage, and chucks embracing and supporting the shells, the chucks being removable from the shells without disturbing the assemblage of roll and shells, the shells and the chucks having cooperating passages for lubricant.

16. A rolling mill comprising a mill roll having a body and necks, the necks having surface portions constituting the journal portions of sliding bearings for the roll, shells encircling and circumferentially wholly enclosing the necks and making a running fit with the journals, chucks embracing and supporting the shells, the shells and the chucks having cooperating passages for lubricant, and means preventing assemblage of the shells in the chucks except in a predetermined orientation whereby the cooperating passages register with one another.

17. A rolling mill comprising a mill roll having a body and necks, the necks having surface portions constituting the journal portions of sliding bearings for the roll, shells encircling and circumferentially wholly enclosing the necks and making a running fit with the journals, chucks embracing and supporting the shells, the shells and the chucks having cooperating passages for lubricant, and means for sealing off the passages in the shells when the same are disassembled from their chucks.

18. In a radial oil film bearing for roll necks, a bearing shell surrounding the neck of the roll and having a cylindrical bearing surface cooperating with a cylindrical surface on the neck of the roll to form an oil film therebetween, oil retaining rings cooperating with surfaces on the roll neck and adapted to confine oil between said bearing surfaces, said rings including a pair of spaced rings at the same end of the bearing surfaces, means for introducing oil to said bearing surfaces, and means communicating with the space between said pair of oil retaining rings and adapted to collect the relatively clean oil that escapes from said bearing surfaces.

19. A rolling mill structure comprising housings, a roll having necks, the roll being operatively supported in said housings but removable therefrom, shells embracing the necks and constituting sliding bearings for the roll, the shells being bodily removable from the housings with the roll and adapted to remain on the necks when the roll is out of the mill, and means for moving each shell to seal the end of the shell from ingress of dirt.

20. A rolling mill comprising a mill roll having a body and necks, the necks having surface portions constituting the journal portions of sliding bearings for the rolls, shells encircling and circumferentially wholly enclosing the necks and making a running fit with the journals, chucks embracing and supporting the shells, and mill housings having windows for the chucks, the mill roll with its shells and chucks being bodily removable from the housings, the shells being adapted to remain on the necks when the roll is out of the mill.

21. In rolling-mill practice, mounting the roll necks on radial oil-film bearings, supplying said radial oil-film bearings with lubricant to provide radial oil films between the relatively rotatable members of the bearings of said rolls, and cooling said oil films to control the viscosity of said lubricant and maintain oil films of predetermined thickness between said relatively rotatable bearing members.

22. In rolling-mill practice, mounting the roll necks on radial oil-film bearings, forming radial oil films between the relatively rotatable bearing members of said rolls to sustain the pressures exerted on said rolls when in operation, and supplying oil under pressure to said films to maintain films of predetermined thickness between the relatively rotatable members of said bearings.

23. In rolling-mill practice, mounting the roll necks on radial oil-film bearings, supplying oil under pressure to said bearings to establish oil films between the relatively rotatable members of said bearings preliminarily to starting the rolls in operation, and maintaining radial oil films between said relatively rotatable bearing members while in operation to sustain the pressures exerted on said rolls uniformly throughout each rotation thereof.

24. In rolling-mill practice, mounting the roll necks on radial oil-film bearings, introducing oil under pressure between the relatively rotatable members of said bearings to establish oil films therebetween preliminarily to starting said rolls in operation, forming radial oil films between the relatively rotatable bearing members of said rolls to sustain the pressures exerted on said rolls when in operation, and thereafter maintaining such a pressure on the oil between said relatively rotatable bearing members as to assure the maintenance of predetermined oil films between said members.

25. In rolling-mill practice, mounting the roll necks on radial oil-film bearings, supplying said radial bearings with lubricating oil, forming radial oil films between the relatively rotatable bearing members of said rolls to sustain the pressures exerted on said rolls when in operation uniformly throughout each rotation thereof, and cooling said oil films to control the viscosity of the oil and maintain predetermined films between said bearing members.

26. In rolling-mill practice, mounting the roll necks on radial oil-film bearings, supplying oil under pressure to said bearings and forming radial oil films between the relatively rotatable members of said rolls to sustain the pressures exerted on said rolls when in operation uniformly throughout each rotation thereof, and cooling said oil films to maintain oil films of proper thickness between said bearing surfaces.

27. In a bearing for roll necks, a sleeve mounted on a roll neck and provided with passages for the circulation of water therethrough and a bearing shell surrounding said sleeve and having a cylindrical bearing surface cooperating with the surface of said sleeve to form an oil film therebetween, and connections for leading water to and from said passages in said sleeve.

28. In a radial oil-film bearing for roll necks, a bearing shell surrounding the neck of a roll and having a cylindrical bearing surface cooperating with a cylindrical surface on the neck to form an oil film therebetween, a chuck surrounding said bearing shell, and means for retaining lubricant in contact with said cylindrical bearing surfaces including one or more members disposed adjacent to the ends of but axially inside of said shell and having oil-retaining contact with said cylindrical surface on the neck within the confines of the bearing portion thereof.

29. In a rolling mill, radial oil film bearings for the necks of a roll, each of said bearings comprising a bearing shell surrounding the neck of the roll and having a cylindrical bearing surface cooperating with a cylindrical surface on the neck of the roll to form an oil film therebetween, spacer rings near each end of said surface, said rings having an annular recess open to the roll neck, and a pair of oil seal rings on opposite sides of each spacer ring to exclude dirt and water and prevent the escape of oil.

30. In a rolling mill, radial oil film bearings for the necks of a roll, each of said bearings comprising a bearing shell surrounding the neck of the roll and having a cylindrical bearing surface cooperating with the cylindrical surface on the neck of the roll to form an oil film therebetween, a chuck adapted to receive said shell, a sealing ring mounted on the inner end of the chuck, and a lip projecting from the roll, overhanging the inner end of the neck and adapted to cooperate with said sealing ring and to maintain sealing contact therewith notwithstanding relative axial movement therebetween.

LORENZ IVERSEN.